United States Patent [19]

Engel

[11] Patent Number: 5,672,057

[45] Date of Patent: Sep. 30, 1997

[54] SPIN ART DEVICE HAVING INFLATABLE COMPONENTS

[76] Inventor: Robert W. Engel, 548 N. Hollyburne La., Thousand Oaks, Calif. 91360

[21] Appl. No.: 717,065

[22] Filed: Sep. 20, 1996

[51] Int. Cl.⁶ .............................. G09B 11/00; B05C 11/08
[52] U.S. Cl. ........................ 434/84; 118/52; 434/101
[58] Field of Search ........................ 434/81, 84, 101, 434/104, 98; 118/52, 56

[56] References Cited

U.S. PATENT DOCUMENTS

| | | | |
|---|---|---|---|
| 1,041,765 | 10/1912 | Fors | 434/104 |
| 2,462,606 | 2/1949 | Brodeur | 434/104 |
| 2,557,348 | 6/1951 | Hornbostel | 91/42 |
| 3,280,792 | 10/1966 | Heyde | 118/52 |
| 3,323,491 | 6/1967 | Granick | 118/506 |
| 3,373,717 | 3/1968 | Morales | 118/6 |
| 4,199,877 | 4/1980 | Akiyama | 434/104 |
| 4,550,679 | 11/1985 | Pipa et al. | 434/84 |
| 4,911,642 | 3/1990 | Knowles | 434/84 |
| 5,157,485 | 10/1992 | Howitt | 358/93 |
| 5,242,496 | 9/1993 | Handy | 118/52 |
| 5,372,506 | 12/1994 | Hambright | 434/84 |
| 5,553,643 | 9/1996 | Goldfarb | 434/101 |

Primary Examiner—Paul J. Hirsch
Attorney, Agent, or Firm—Charles B. Katz

[57] ABSTRACT

A device for creating spin art is provided having inflatable components to facilitate packaging and storage thereof. An inflatable disk-shaped platen is coupled for rotation with the upstanding shaft of an electrical motor. The platen includes a broad upper surface for supporting and removably retaining thereon a workpiece. An inflatable splash container partially encloses the motor and platen to prevent splashing of paint from the rapidly rotating workpiece onto nearby objects while allowing the user to pour paint onto the workpiece through the open top. The device optionally comprises as an additional safeguard against splashing an inflatable annular cover which engages the upper rim of the splash container sidewall and which includes a central opening through which the user may access the workpiece.

4 Claims, 3 Drawing Sheets

SPIN ART DEVICE HAVING INFLATABLE COMPONENTS

FIELD OF THE INVENTION

The present invention relates generally to a device for painting objects and more particularly to a device for producing spin art having inflatable components.

BACKGROUND OF THE INVENTION

Spin art is a process whereby paint or other coloring media is applied to an object while the object is rapidly rotated on a platen or table. Centrifugal forces associated with the rotation of the object cause the paint to be spread outward over the surface of the object in pleasing geometric patterns. The artist may control the resulting pattern to some extent by selecting the colors of the paint and the location at which the paint is applied. However, a salient characteristic of spin art is that a unique pattern is produced each time the process is undertaken. Spin art has particular appeal to younger children due to the ease with which pleasing patterns may be obtained and the unique character of the patterns.

The majority of devices for producing spin art (also known variously as swirl art or splash art) are large and costly and are typically sold to persons or commercial concerns who operate concessions at carnivals, fairs, art shows and the like. Spin art devices intended for commercial use generally include a relatively large rotating platen which can accommodate for decoration a wide variety of objects. A particularly popular use of spin art devices is to decorate items of clothing such as t-shirts.

The prior art does include a number of spin art devices intended for home use. Illustrative examples of such devices are disclosed in U.S. Pat. Nos. 3,280,792 ("Apparatus for and Method of Splash Painting" issued to Heyde); 3,323,491 ("Color Spinner Toy" issued to Granick), and; 5,242,496 ("Spinning Platen Paint Set" issued to Handy). In order to keep the size and expense of these devices reasonable, home-use spin art devices are generally equipped with platens of relatively small size. The objects which can be decorated using these devices are consequently limited to small cards, disks of paper, etc. It is believed that the narrow capabilities of prior art devices has substantially reduced their appeal.

SUMMARY

It is therefore an object of the present invention to provide a spin art device intended for home use which may be used to decorate objects of relatively large dimension, such as t-shirts, pillowcases, and the like.

It is another object of the present invention to provide a spin art device for home use which may be inexpensively manufactured and sold.

It is a more specific object of the present invention to provide a spin art device making use of air-inflatable components to reduce weight and enable collapsing of the device to a compact volume for packaging and storage.

In accordance with the present invention, a spin art device is provided comprising a an electrical motor driving a rotating shaft, which is in turn coupled to a platen supporting on its upper surface the object to be decorated (the "workpiece"). To facilitate indoor use of the spin art device, the motor and platen are held within a generally cylindrical splash container having a floor and an upstanding peripheral sidewall for containing the paint or other decorating media flung from the rapidly rotating workpiece. The device may additionally comprise for further protection against spattering a horizontally-oriented inflatable annular cover engaging along its outer margins the upper rim of the sidewall.

The essence of the invention lies in the inflatable construction of the platen and splash container. The platen consists of an inflatable disk, typically having a diameter of between 30" and 50". Platen mounting means attached to the underside of the platen are provided for coupling the platen to the motor's shaft. The upper surface of the platen is substantially flat for supporting the workpiece.

The splash container comprises a floor fabricated from a flexible material and an inflatable peripheral sidewall. The floor preferably includes a enclosure for retaining the motor in a central location and for preventing paint or other liquid media accumulated on the container floor from interfering with the motor's operation.

It is appreciated that by employing an inflatable construction for the platen and the splash guard, there is provided a spin art device which may be compactly packaged for shipping and display as well as for storage during periods of disuse. In its inflated state, the device is capable of decorating a wide range of items, including t-shirts, pillowcases, etc.

DETAILED DESCRIPTION OF THE PREFERRED EMBODIMENT

Figure 1:
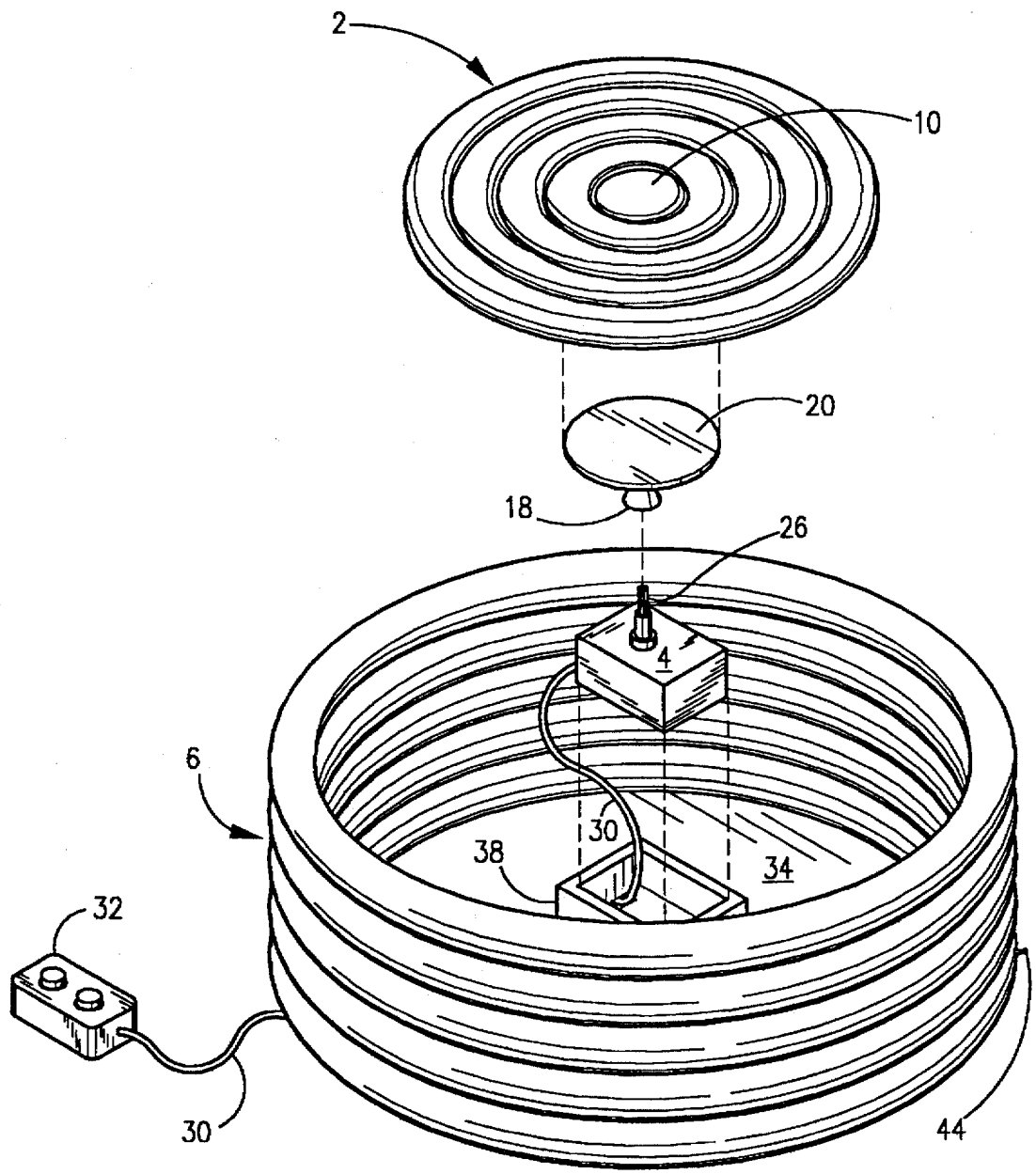
FIG. 1 is an exploded isometric view of a spin art device according to the present invention.
Figure 2:
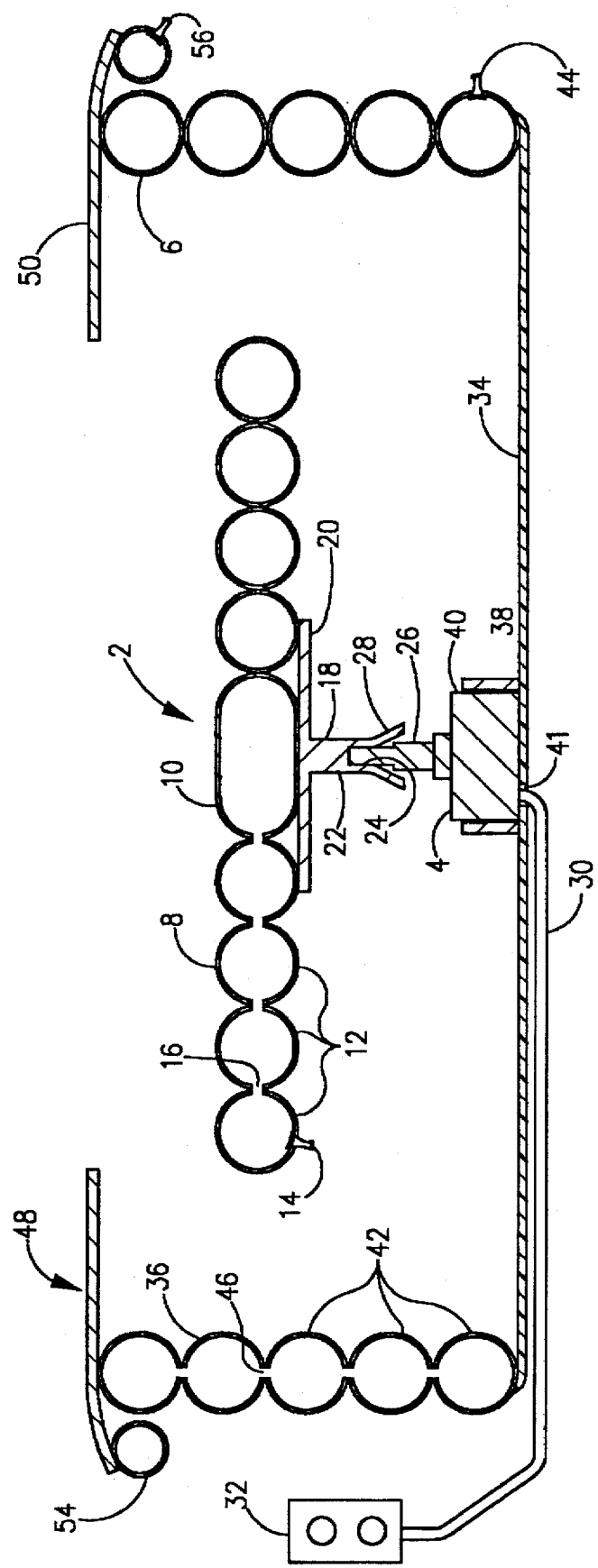
FIG. 2 is a vertical sectional view of the spin art device.

Reference being generally made to the figures, and in particular to FIGS. 1 and 2, it is seen that in accordance with the present invention there is provided a spin art device comprising inflatable disk-shaped platen 2 detachably mounted to the electrical motor 4 for co-rotation therewith. During operation of the device, the platen and motor are positioned within splash container 6 which retains paint thrown from the rotating workpiece and thereby prevents spattering of nearby surfaces. To facilitate packaging, transportation and storage of the device, the platen, motor and splash container are easily separable.

As depicted in FIGS. 1 and 2, inflatable platen 2 is generally disk-shaped, having a broad and substantially horizontal upper surface 8 for supporting thereon the item to be decorated (the "workpiece"). It will be apparent to those skilled in the art that several different constructions of the inflatable platen are possible. It has been observed, however, that for the purpose of preventing deformation of the platen under conditions of relatively high loading and rotational velocity, the preferred construction of the platen, as depicted in FIG. 2, comprises inner disk member 10 and a plurality of concentric ring members (designated collectively as 12), the inner disk member and ring members being joined along their common boundaries by heat sealing or other suitable method to approximate an overall disk-like shape. The pinner disk member and ring members are advantageously fabricated from a substantially transparent material to assist the user in assembling the platen to the motor as hereinafter described. Air valve 14 of the conventional type opening into the interior volume of the platen is provided to enable inflation and deflation of the platen. Passageways 16 formed in the boundaries between the inflatable rings allow gaseous communication therebetween such that the inner disk member and outer ring members are inflated or deflated simultaneously.

In an alternative construction of the platen, a non-communicated outer ring is provided which may be filled or partially filled with water via a port or removable closure providing access to the ring's interior. The addition of water to the outermost ring serves the purpose of substantially increasing the platen's moment of inertia, thereby stabilizing the platen's rotation when the workpiece is eccentrically placed thereon or if the workpiece is asymmetric.

The present invention contemplates a variety of means for removably securing the workpiece to upper surface 8 of platen 2. As a simple and advantageous solution, the user may employ strips of double-sided adhesive tape (cellophane tape having adhesive material disposed on both sides thereof) interposed between the workpiece and platen upper surface. This method for fastening the workpiece to the platen may be easily adapted to different sizes and shapes of workpieces by selecting the required number of adhesive strips and arranging them accordingly. Alternatively, a system of clips, elastic straps or other retainers may be provided on the platen's upper surface for removably securing the workpiece to the platen.

Figure 3:
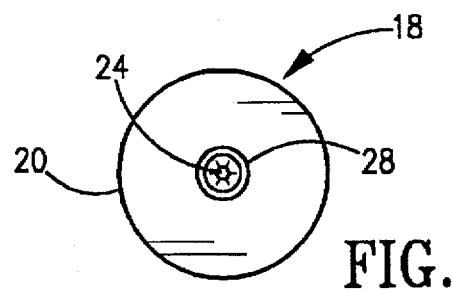
FIG. 3 is an isolated bottom plan view of the platen mounting means.

Referring now to FIGS. 2 and 3, platen mounting means 18 includes a generally planar portion 20 for attachment to the underside of the platen and depending cylindrical portion 22 having defined interiorly thereto socket 24 keyed for mating with the upper end of shaft 26 rotationally driven by motor 4. The platen mounting means may be secured to the underside of the platen by heat-sealing, adhesive or equivalent technique. The platen mounting means preferably includes skirt 28 opening downwardly and outwardly from the lower end of the cylindrical portion to assist the user in guiding the socket onto the shaft during assembly of the device.

Motor 4 is preferably a conventional direct-current variable-speed electric motor of a type which is widely commercially available. The motor is electrically connected by power cord 30 to one or more dry cell batteries held within control housing 32. The control housing also preferably includes switching means in operative association with the motor for starting, stopping, and reversing the motor, as well as a variable resistor for controlling the speed of rotation of the motor. Motor shaft 26 projects vertically upwards from the motor, the upper end of the shaft being keyed (as with the hexagonal cross-section depicted) to engage cooperatively keyed socket 24 formed within cylindrical portion 22 depending downwardly from platen mounting means 18.

The spin art device is advantageously provided with splash container 6 for the retention therein of paint thrown by centrifugal force from the rapidly rotating workpiece. Utilization of the splash container facilitates indoor use of the spin art device by preventing undesirable splattering of paint on nearby objects or surfaces. Referring to FIGS. 1 and 2, the splash container generally comprises floor member 34 joined at its periphery to upstanding inflatable sidewall 36. The floor member is preferably fabricated from a sheet of flexible polymeric material to permit its folding into a compact volume when the sidewall is collapsed for storage.

Formed generally centrally on floor member 34 are upstanding walls 38 which define motor enclosure 40. The motor enclosure functions both to retain the motor therewithin and to prevent paint collected on the floor member from flowing onto the motor and disrupting its operation. A portion of the floor within the motor enclosure is cut out to form opening 41 allowing power cord 30 to pass therethrough and beneath the floor to the exterior of splash container 6. It is appreciated that the enclosure walls further function to prevent the undesirable leakage of paint accumulated on the floor outside of the enclosure through the opening and onto the surface on which the container is supported.

To enhance the structural rigidity of splash container sidewall 36 and minimize deformation thereof, the sidewall comprises a plurality of intercommunicated joined tubes 42 in vertically stacked relationship. An air valve 44 of the usual type positioned in the wall of one tube permits inflation and deflation of the sidewall. Adjacent tubes are joined by heat-sealing or other suitable technique. Passageways 46 formed between adjacent stacked tubes enable the gaseous intercommunication of the tubes' interior volumes.

Figure 4:
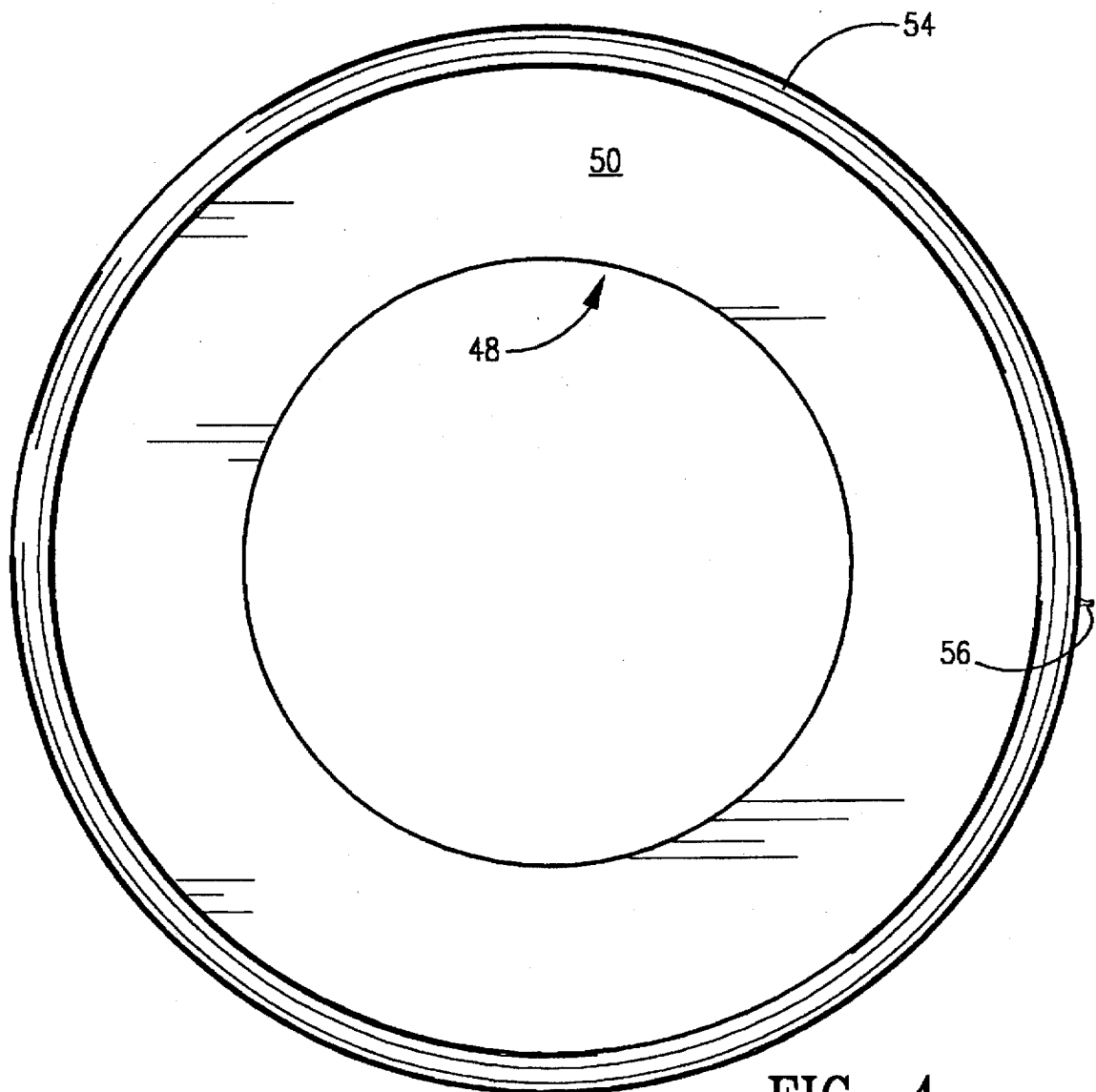
FIG. 4 is a bottom plan view of the inflatable splash container cover.

For additional protection against ejection of paint or other decorating media from the confines of the splash container, the device may be provided with inflatable annularly-shaped cover 48. Referring to FIGS. 2 and 4, the cover comprises a flexible annular sheet 50 joined peripherally to inflatable tube 54, the tube including conventional air valve 56 for inflation and deflation thereof. When engaged with sidewall 36, tube 54 is positioned adjacent and exterior to the uppermost sidewall ring 42. The cover is adapted with a central opening disposed above platen 2 to permit the user to pour paint therethrough onto the workpiece, while sheet 50 provides an additional safeguard against spattering of paint onto nearby objects.

The mode of operation of the present invention should be apparent from the foregoing description and from prior art knowledge of the spin art process, but will be discussed in brief below for the sake of completeness. Splash container 6 and platen 2 are inflated for use via respective air valves 44 and 14. Motor 4 is placed within motor enclosure 40 with power cord 30 threaded through floor opening 41 formed in floor 34. The inflated platen is mounted to motor shaft 26 by mating the keyed portions of the shaft and platen mounting means 18. The workpiece is secured to the upper surface of the platen by use of adhesive tape as set forth hereinabove. If use of cover 48 is desired, cover tube 54 is inflated via valve 56 and the cover is positioned on top of splash container sidewall 36.

Actuation of the motor is effected by engaging the power switch contained in control housing 32. The motor may be driven at the desired rotational velocity according to the setting of the variable resistor electrically associated therewith. It has been found that optimal results are obtained when the platen is rotated at approximately 1000-1200 revolutions per minute.

When the platen reaches the desired rotational velocity, the user selects a paint container, typically in the form of a flexible molded squeeze bottle, and pours or drips a portion of the paint held within onto the rotating workpiece. This process is repeated with various colors of paint applied to different locations on the workpiece until the desired results are obtained, at which time the motor is turned off and the workpiece removed from the platen. Patterns produced by the action of centrifugal force on the applied paint may be adjusted by varying the speed and direction of rotation by means of the appropriate controls held within the control housing. Paint ejected from the workpiece is retained within the splash container and is collected on the floor thereof.

It should be understood that an unlimited number of configurations of the present invention can be realized which satisfy the requirements described above. The foregoing discussion discloses and describes merely exemplary embodiments of the present invention. One skilled in the art will readily recognize from the discussion, and from the accompanying drawings, that various changes and modifications can be made without departing from the spirit and scope of the invention, as defined in the following claims.

What is claimed is:

1. A spin art device comprising:

a splash container having closed sides and bottom and an open top, said splash container comprising a floor and an inflatable peripheral sidewall extending generally upwardly therefrom;

an electrical motor having an upwardly projecting shaft, said motor being positioned on said floor generally centrally within said splash container;

an inflatable platen having a substantially horizontal upper surface for supporting thereon a workpiece for decoration, and;

means for mounting said platen to said shaft of said motor such that said platen rotates with said shaft.

2. A spin art device according to claim 1 further comprising electrical control means in operative association with said motor for starting, stopping and reversing the motion of said shaft of said motor.

3. A spin art device according to claim 1 wherein said platen mounting means comprise a planar member fixedly attached to the underside of said platen, and an elongated cylindrical member depending centrally from said planar member, said cylindrical member having defined interiorly thereto a socket keyed for mating relationship with the upper end of said shaft of said motor.

4. A spin art device according to claim 1 further comprising an inflatable annular cover supported on the upper rim of said sidewall, said cover having a central opening allowing the user to pour paint therethrough onto the workpiece.

* * * * *